United States Patent
Conover et al.

(10) Patent No.: US 11,210,120 B2
(45) Date of Patent: Dec. 28, 2021

(54) LOCATION MANAGEMENT IN A VOLUME ACTION SERVICE

(71) Applicant: VMware, Inc., Palo Alto, CA (US)

(72) Inventors: Matthew Conover, Mountain View, CA (US); Steven Lawson, Aurora, CO (US); Jeffrey Paul Ulatoski, Pleasanton, CA (US)

(73) Assignee: VMware, Inc., Palo Alto, CA (US)

( * ) Notice: Subject to any disclaimer, the term of this patent is extended or adjusted under 35 U.S.C. 154(b) by 350 days.

(21) Appl. No.: 14/668,180

(22) Filed: Mar. 25, 2015

(65) Prior Publication Data

US 2015/0378768 A1 Dec. 31, 2015

Related U.S. Application Data (60) Provisional application No. 62/019,271, filed on Jun. 30, 2014.

(51) Int. Cl.
*G06F 9/455* (2018.01)

(52) U.S. Cl.
CPC ............ *G06F 9/45558* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 8,352,608 | B1* | 1/2013 | Keagy | G06F 8/63 709/226 |
| 9,158,561 | B2* | 10/2015 | Conover | G06F 9/45533 |
| 9,253,156 | B2* | 2/2016 | Kashyap | H04L 63/0263 |
| 9,424,057 | B2* | 8/2016 | Emaru | H04L 67/1097 |
| 9,639,385 | B2* | 5/2017 | Conover | G06F 9/45558 |
| 9,999,030 | B2* | 6/2018 | Gu | H04W 56/001 |
| 10,324,744 | B2* | 6/2019 | Ulatoski | G06F 9/455 |
| 10,528,279 | B2* | 1/2020 | Nasu | G06F 3/0604 |
| 2008/0005748 | A1* | 1/2008 | Mathew | G06F 11/0712 719/318 |
| 2009/0182928 | A1* | 7/2009 | Becker | G06F 9/45558 711/6 |
| 2010/0153947 | A1* | 6/2010 | Haruma | G06F 9/45558 718/1 |
| 2011/0296052 | A1* | 12/2011 | Guo | G06F 9/5077 709/240 |
| 2011/0307889 | A1* | 12/2011 | Moriki | G06F 9/45558 718/1 |

(Continued)

*Primary Examiner* — Hiren P Patel (57) ABSTRACT

Systems, methods, and software described herein manage volumes and virtual machines using a location database gathered from a hypervisor management system. In one example, a method of operating a volume attachment service to manage volumes and virtual machines includes transferring a location request to a hypervisor management service to identify locations of one or more virtual machines. The method further provides, receiving the locations of the one or more virtual machines and storing the locations in a location database. The method also includes identifying a volume action request for a first virtual machine, and directing the volume action request to a hypervisor of the first virtual machine based on the locations in the location database.

17 Claims, 8 Drawing Sheets

(56) References Cited

U.S. PATENT DOCUMENTS

| | | | |
|---|---|---|---|
| 2012/0174096 A1* | 7/2012 | Conover | G06F 9/45558 718/1 |
| 2012/0209812 A1* | 8/2012 | Bezbaruah | G06F 9/45558 707/646 |
| 2012/0254445 A1* | 10/2012 | Kawamoto | G06F 9/5088 709/226 |
| 2013/0238802 A1* | 9/2013 | Sarikaya | H04L 29/08153 709/226 |
| 2013/0239108 A1* | 9/2013 | Lee | G06F 9/45533 718/1 |
| 2013/0311989 A1* | 11/2013 | Ota | G06F 9/45558 718/1 |
| 2013/0318526 A1* | 11/2013 | Conrad | G06F 9/45533 718/1 |
| 2014/0068343 A1* | 3/2014 | Nakajima | G06F 11/3051 714/39 |
| 2014/0149980 A1* | 5/2014 | Vittal | G06F 9/5072 718/1 |
| 2014/0181804 A1* | 6/2014 | Sakata | G06F 9/455 718/1 |
| 2014/0192804 A1* | 7/2014 | Ghanwani | H04L 49/70 370/390 |
| 2014/0208049 A1* | 7/2014 | Furusawa | G06F 3/0647 711/162 |
| 2014/0310409 A1* | 10/2014 | Ohsuga | H04L 43/08 709/224 |
| 2014/0380310 A1* | 12/2014 | Wei | G06F 9/45558 718/1 |
| 2015/0169291 A1* | 6/2015 | Dube | G06F 8/20 717/101 |
| 2015/0317175 A1* | 11/2015 | Tada | G06F 11/20 718/1 |

* cited by examiner

| LOCATION DATABASE 300 | | |
|---|---|---|
| VM I.D. 310 | HYPERVISOR I.D. 320 | HOST I.D. 330 |
| 1 | ALPHA | A |
| 2 | ALPHA | A |
| 3 | BETA | B |
| ... | ... | ... |
| n | THETA | C |

FIGURE 8

LOCATION MANAGEMENT IN A VOLUME ACTION SERVICE

TECHNICAL FIELD

This application is related to and claims priority to U.S. Provisional Patent Application No. 62/019,271, entitled "LOCATION MANAGEMENT IN A VOLUME ACTION SERVICE," filed on Jun. 30, 2014, and which is hereby incorporated by reference in its entirety.

TECHNICAL FIELD

Aspects of the disclosure are related to the management of virtual machines, and in particular to managing volume attach and detach actions with virtual machines.

TECHNICAL BACKGROUND

Virtualization techniques have gained popularity and are now commonplace in data centers and other environments in which it is useful to increase the efficiency with which computing resources are used. In a virtualized environment, one or more virtual machines are instantiated on an underlying computer, or host, and share the resources of the underlying computer. To provide the resources necessary for each of the virtual machines, a hypervisor may execute on top of the host to abstract the physical components of the underlying computer and provide virtual components to the virtual machine. In some implementations, the hypervisor may be implemented at a layer above the host operating system, while in other implementations, the hypervisor may be integrated with the operating system.

In addition to the hypervisors that provide the virtual machines, data centers may employ a hypervisor manager that manages all of the hypervisors within the data center. This hypervisor manager, such as VMware vCenter, Microsoft System Center Virtual Machine Manager, and Microsoft Hyper-V, allows an administrator to control the execution of a plurality of virtual machines on a plurality of hypervisors through a centralized service. Accordingly, rather than configuring each of the virtual machines through the individual hypervisors, a hypervisor manager may be used to configure virtual machines over a plurality of hosts and hypervisors. However, because the hypervisor manager is a centralized control system, if the hypervisor manager becomes unavailable or overloaded with requests to the virtual machines, new virtual machine requests might be bottlenecked or prevented from being implemented.

OVERVIEW

Provided herein are systems, methods, and software to manage volumes and virtual machines using a location database gathered from a hypervisor management system. In one example, a method of operating a volume attachment service to manage volumes and virtual machines includes transferring a location request to a hypervisor management service to identify locations of one or more virtual machines. The method further provides receiving the locations of the one or more virtual machines and storing the locations in a location database. The method also includes, in response to a volume action request, directing the volume action request to a hypervisor of the first virtual machine based on the locations in the location database.

In another instance, an apparatus to manage volumes in virtual machines includes one or more non-transitory computer readable media. The apparatus further includes processing instructions stored on the one or more non-transitory computer readable media that, when executed by processing circuitry, direct the processing circuitry to transfer a location request to a hypervisor management service to identify locations of one or more virtual machines. The processing instructions further direct the processing circuitry to receive the locations of the one or more virtual machines and store the locations in a location database, wherein the location of the one or more virtual machines each comprise a virtual machine identifier associated with a host identifier. The processing instructions also direct the processing circuitry to, in response to a volume action request for a first virtual machine, direct the volume action request to a hypervisor of the first virtual machine based on the locations in the location database.

In a further example, a system to manage a plurality of storage volumes and a plurality of virtual machines includes the plurality of virtual machines executing via a plurality of hypervisors. The system further includes a volume action service system configured to transfer a location request to a hypervisor management service system to identify locations of the plurality of virtual machines, receive the locations of the plurality of virtual machines, and store the locations in a location database. The volume action service is also configured to, in response to a volume action request for a first virtual machine, direct the volume action request to a hypervisor of the plurality of hypervisors for the first virtual machine.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Virtual machines provide an efficient way of maximizing the use of resources on host computing systems. To accomplish this task, one or more hypervisors executing on a host computing system abstract the physical components of the host computing system, and provide the components to one or more virtual machines. These virtual machines operate as a standalone-computing device with an operating system, applications, and other operations to perform specific tasks, but share the physical resources of the underlying host.

In the present example, a plurality of hosts may be initiated, each with one or more hypervisors and virtual machines. To manage the initiated virtual machines across each of the hosts, a hypervisor management service may be configured that is capable of initiated, stopping, selecting storage disks, or any other configuration mechanism for the virtual machines on the hosts. Accordingly, rather than configuring each of the virtual machines at the hypervisor on the individual hosts, the hypervisor management service allows an administrator or other management service to allocate and provision virtual machine resources from a centralized location.

In addition to the hypervisor management service, a data center with one or more hosts may also employ a volume action service to manage that attachment and detachment of storage volumes to the virtual machines. In some instances, these attachable storage volumes include applications that, when attached, become executable in a virtual machine without installation. For example, a user of a virtual machine may require a word processing application. Rather than identifying the application and following the steps for installation, a volume that contains the word processing application may be mounted to the virtual machine, and registry keys and other files on the virtual machine may be modified to make the application appear as though it had been installed locally within the virtual machine. Further, in some instances, the application elements, such as files and directories, may be overlaid within the file system of a disk previously available on the virtual machine. This overlaying allows the applications to appear in a centralized location for the user. For example, a Microsoft Windows virtual machine may include a C: drive that includes user data, applications, as well as other files and directories. When the user of the virtual machine requires an application, the application volume may be attached, and the application elements overlaid within the file system for the C: drive to make the applications appear as though they have been locally installed in the C: drive.

Here, to manage volume action requests without relying on the provisioning and volume allocation services offered by the hypervisor management service, the volume actions service periodically requests and receives location information regarding the virtual machines in the computing environment. This location information may include the identity of the virtual machine, the identity or address of the host, the identity of the hypervisor responsible for the virtual machine, or any other network location information. Once the locations are determined, the volume action service may identify volume action requests for the virtual machine and direct the requests to the appropriate hypervisor based on the location information received from the hypervisor management service. This volume action request may be initiated by a user of one of the virtual machines, by an administrator of the virtual machine environment, or by any other person or process.

Figure 1:
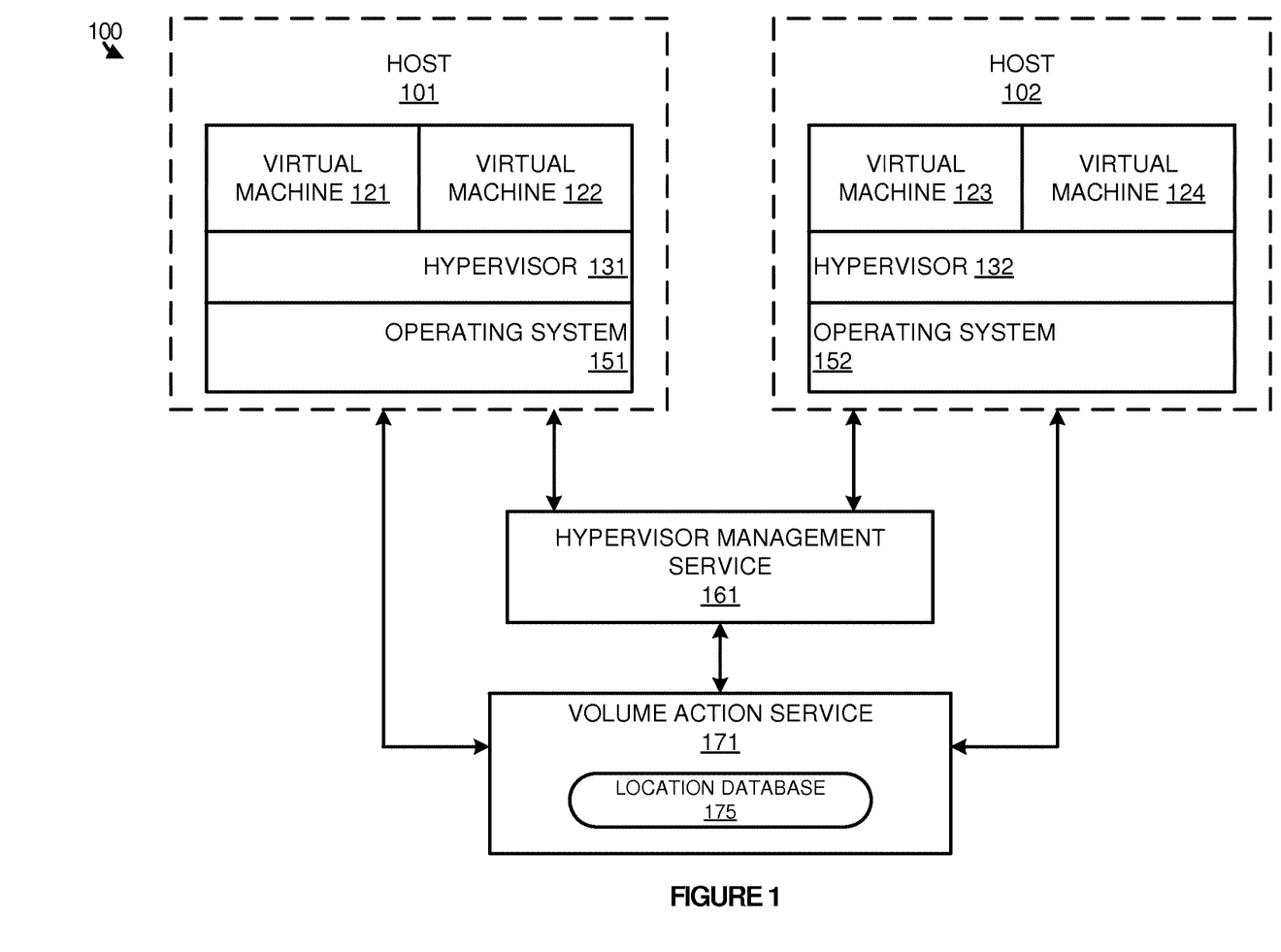
FIG. 1 illustrates a computing environment to manage the locations of virtual machines.

To further illustrate the operation of the volume action service, FIG. 1 is included. FIG. 1 illustrates a computing environment 100 to manage the locations of virtual machines. Computing environment 100 includes hosts 101-102, hypervisor management service 161, and volume action service 171. Hosts 101-102 further include virtual machines 121-124, hypervisors 131-132, and operating systems 151-152.

In operation, virtual machines 121-124 execute on hosts 101-102 via hypervisors 131-132. Hypervisors 131-132 abstract the components of hosts 101-102 and provide the virtual components to virtual machines 121-124 to allow the virtual machines to share resources on the hosts. To configure and manage the virtual machines, hypervisor management service 161 is included that allows for centralized management of allocating resources to virtual machines across a plurality of hypervisors. As further illustrated in computing environment 100, a virtual machine environment may further include a volume action service 171. Volume action service 171 manages the attachment and detachment of volumes, such as application volumes, to the virtual machines. For instance, when a user or administrator requires the use of a specific application, volume action service 171 may identify the particular volume that contains the application and initiate the attachment of the volume to the virtual machine using the hypervisor for the virtual machine.

In the present example, volume action service 171 further manages the locations of the virtual machines using location database 175. To manage the locations, volume action service requests and receives virtual machine locations from hypervisor management service 161, which manages the allocation of the virtual machines on the various hosts. Once the locations are received, volume action service 171 may handle volume action requests based on the locations stored in location database 175. Accordingly, rather than relying on hypervisor management service 161 to handle every volume action request, volume action service 171 may distribute the various volume action requests to the hypervisors, allowing the hypervisors to individually handle the attachment of the volumes.

Figure 2:
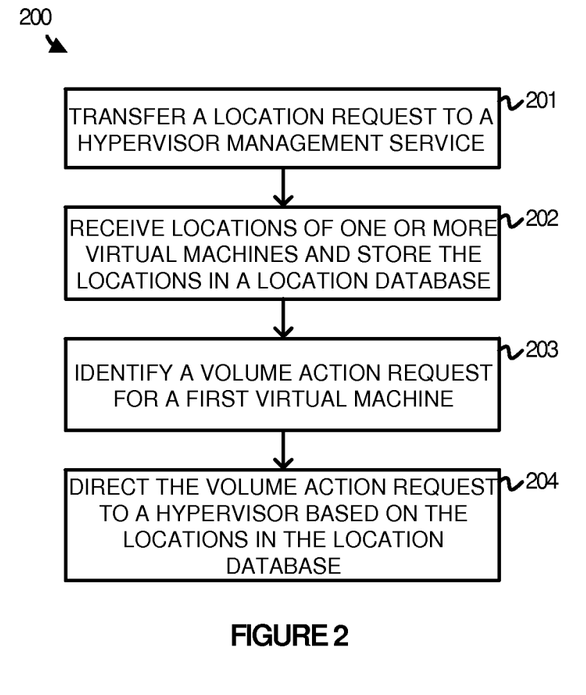
FIG. 2 illustrates a method of operating a volume action service to manage the locations of virtual machines.

As a further illustration of the operation of volume action service 171, FIG. 2 is provided. FIG. 2 illustrates a method 200 of operating a volume action service to manage the locations of virtual machines. As illustrated, the volumes action service transfers a location request to a hypervisor management service (201) and, in turn, receives locations of one or more virtual machines to be stored in a location database (202). These locations of the one or more virtual machines may include hypervisor identifiers, host identifiers or addresses, as well as any other location information about the virtual machines. Once the locations are stored within the location database, the volume action service may identify a volume action request for a first virtual machine (203), and direct the volume action request to a hypervisor corresponding to the first virtual machine based on the locations in the location database (204).

For example, referring to FIG. 1, volume action service 171 may inquire hypervisor management service 161 for locations of the various virtual machines within the virtual machine environment. Responsive to the request, hypervisor management service 161 identifies the locations of the virtual machines that are managed by hypervisor management service 161 and transfers the locations to volume action service 171. Once the locations are received and stored in location database 175, volume action service 171 may receive volume action requests for virtual machines from an administrator, a user, or some other process in the environment. For instance, a volume action request may include a request to detach all application volumes associated with virtual machine 121. Responsive to the request, volume action service 171 identifies the location of virtual machine 121 using location database 175, and transfers the detach request to hypervisor 131 to initiate the detaching of the application volumes.

In some examples, volume action service 171 may inquire hypervisor management service 161 at periodic intervals to maintain an updated database of virtual machine locations. This periodic interval may be every five minutes, every hour, or some other periodic interval. In some instances, volume action service 171 may attempt to use hypervisor management service 161 to process a volume action request. However, if hypervisor management service 161 is overloaded or inoperable, volume action service 171 may transfer the volume action request to the appropriate hypervisor based on location database 175. In other occurrences, rather than attempting to use hypervisor management service 161 for any of the volume action requests, volume action service 171 may transfer the volume action request directly to the appropriate hypervisor based on the information that is stored in location database 175.

Figure 3:
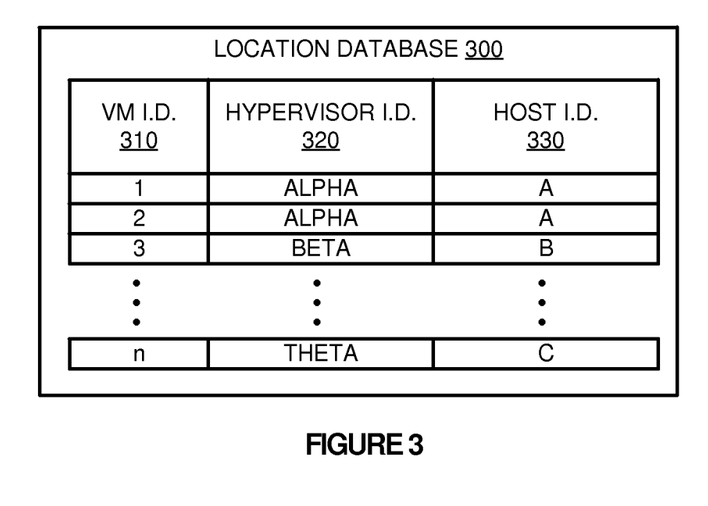
FIG. 3 illustrates a location database to manage virtual machine locations for a volume action service.

Turning to FIG. 3, FIG. 3 illustrates a location database 300 to manage virtual machine locations for a volume action service. Although location database 300 is illustrated as a table in the present example, it should be understood that location database 300 might comprise a linked list, a tree, or any other type of data structure. Location database 300 includes virtual machine identifier (I.D.) 310, hypervisor I.D. 320, and host I.D. 330.

In operation, a hypervisor management service may be used to manage the execution of a plurality of virtual machines across a plurality of hypervisors. This management may include provisioning the virtual machines and allocating various resources to each of the executing virtual machines, such as memory and processing cores. Further, the hypervisor management service may also include a database to maintain the locations of the various virtual machines within the computing environment.

In addition to the hypervisor management service, some computing environments may include a volume action service that handles volume actions, such as volume attachments and detachments, to each of the virtual machines. This volume attachment may allow for the attachment of user data, as well as various applications to be executable within the virtual machine without installation. For example, a user may require a video editing application, and rather than installing the application locally on the virtual machine, a volume containing the application may be attached, and application components overlaid to make the application appear as though it had been locally installed. Here, rather than relying on the hypervisor management service to process each of the volume requests, the volume action service may distribute the volume actions to each of the individual hypervisors, allowing the individual hypervisors to handle the attachment of the necessary volumes.

In some examples, the volume action service may periodically retrieve virtual machine locations from the hypervisor management service. By periodically checking, location database 300 may stay current with any new virtual machines that are initiated, as well as monitor for any migration of virtual machines to new hosts or hypervisors. In the present instance, location database 300 includes identifiers for the virtual machines, the hosts, and the hypervisors, although other possible location information may be gathered for location database 300. Accordingly, when a volume request is received by the volume action service, rather than necessarily communicating with the hypervisor management service to process the request, the volume action service may use location database 300 to transfer the action to the appropriate hypervisor responsible for attaching and detaching the volumes.

Figure 4:
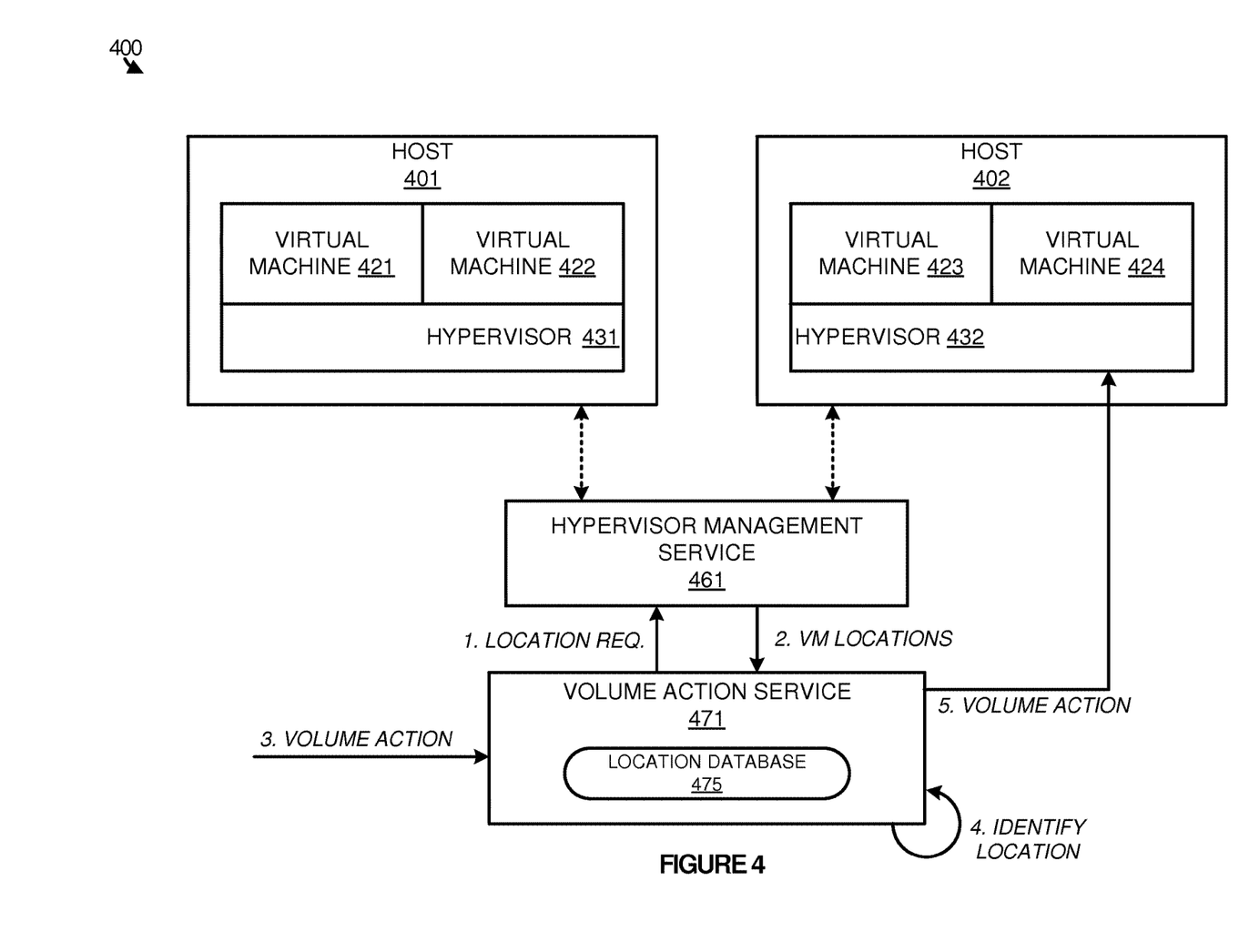
FIG. 4 illustrates an overview of handling volume action requests using a volume action service.

FIG. 4 illustrates an overview 400 of handling volume action requests using a volume action service. Overview 400 includes hosts 401-402, hypervisor management service 461, and volume action service 471. Hosts 401-402 further include virtual machines 421-424 and hypervisor 431-432. Similar to the operations described in the preceding figures, hypervisors 431-432 abstracts the components of hosts 401-402 and provides the necessary components to virtual machines 421-424. To manage the operations on each of the hosts, hypervisor management service 461 is included that allows a centralized administrator control the operations of a plurality of hypervisors spread out amongst multiple hosts. Accordingly, hypervisor management service 461 may maintain a location, such as the hypervisor and host, for each of the virtual machines.

As illustrated in overview 400, a computing environment may further include a volume action service 471 that is responsible for attaching and detaching application volumes to the various virtual machines. To accomplish this task without every volume action request being passed through hypervisor management service 461, volume action service 471 requests virtual machine locations from hypervisor management service 461. Responsive to the request, hypervisor management service 461 transfers the locations of each of the virtual machines in the virtual environment to be stored by volume actions service 471 in location database 475. Once the locations are received and stored by volume action service 471, volume action requests are capable of processing without the need of passing the request through hypervisor management service 471.

For example, a volume action request is received in overview 400 for virtual machine 424. Responsive to the request, volume action service 471 uses location database 475 to identify the location of the virtual machine, which in this case resides on host 402 with hypervisor 432. Thus, volume action service 471 transfers the request to hypervisor 432 for completion. In some instances, the volume request may include a request to attach volumes to virtual machine 424. Thus, hypervisor 432 may assist in mounting and making available the application within virtual machine 424 without the need of installing the application. In other instances, the volume request may include a request to detach a volume from the virtual machine. This may occur when the user logs off, or at some other detach instance. Thus, when the volume request is transferred to hypervisor 432, hypervisor 432 assists in detaching the one or more volumes from virtual machine 424.

Although illustrated in the present example as requesting locations from hypervisor management system 461, it should be understood that in some examples, hypervisor management service 461 may be configured to periodically transfer locations to volume action service 471 without an inquiry.

Figure 5:
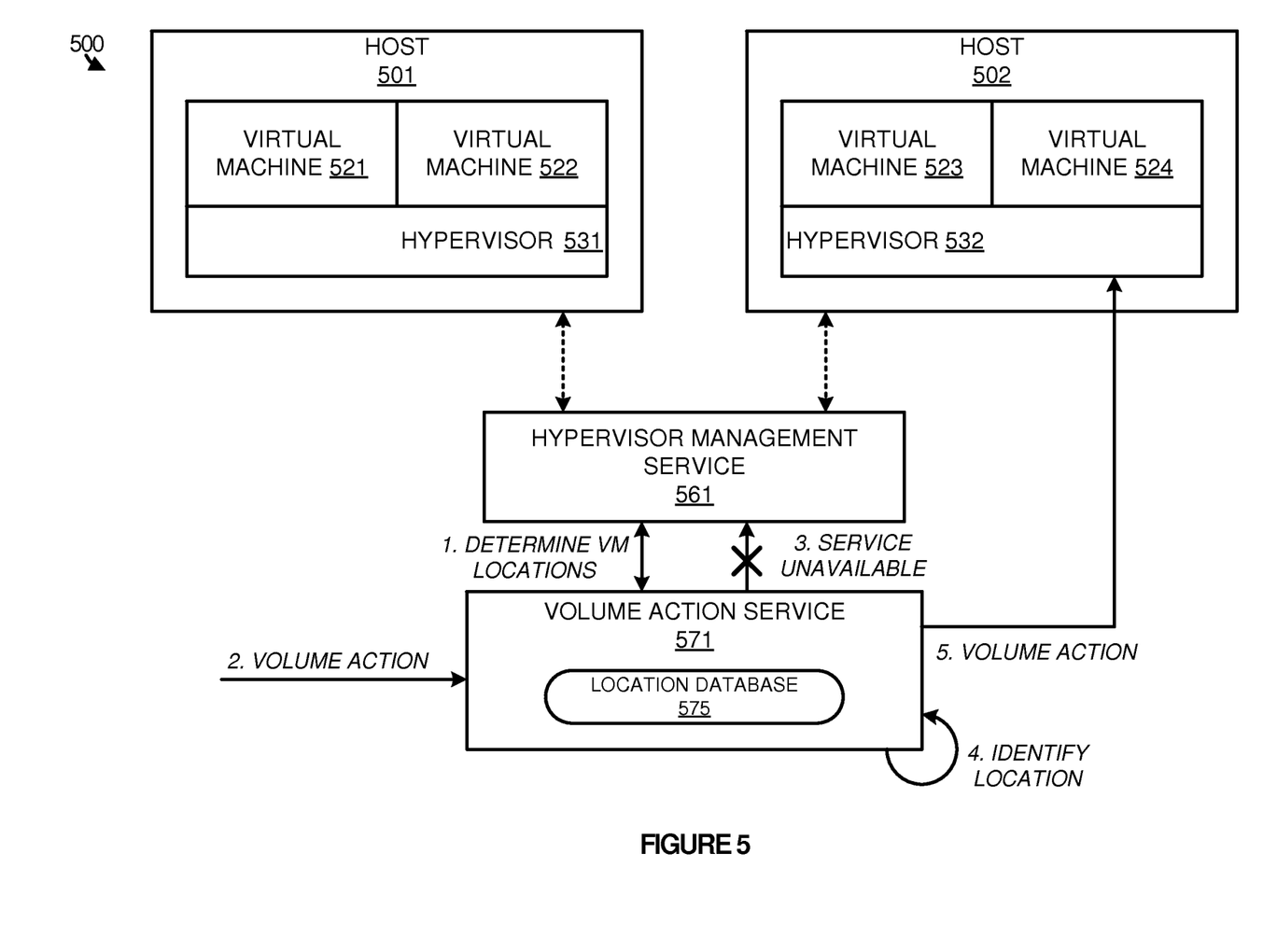
FIG. 5 illustrates an overview of handling volume action requests using a volume action service.

Turning now to FIG. 5, FIG. 5 illustrates an overview 500 of handling volume action requests using a volume action service. Overview 500 includes hosts 501-502, hypervisor management service 561, and volume action service 571. Hosts 501-502 further include virtual machines 521-524 and hypervisor 531-532. Similar to the operations described in the preceding figures, hypervisors 531-532 abstract the components of hosts 501-502 and provide the necessary components to virtual machines 521-524. To manage the operations on each of the hosts, hypervisor management service 561 is included that allows a centralized administrator system to control the operations of a plurality of hypervisors spread out amongst multiple hosts. Accordingly, hypervisor management service 561 may maintain a location, such as the hypervisor and host identifier, for each of the virtual machines.

As illustrated in overview 500, a computing environment may further include a volume action service 571 that is responsible for attaching and detaching application volumes to the various virtual machines. To accomplish this task without every volume action request being passed through hypervisor management service 561, volume action service 571 requests virtual machine locations from hypervisor management service 561. Responsive to the request, hypervisor management service 561 transfers the locations of each of the virtual machines in the virtual environment to be stored with volume action service 571 in location database 575. Once the locations are received and stored by volume action service 571, volume action requests are capable of processing without the need of passing the request through hypervisor management service 571.

For instance, as illustrated in overview 500, a volume action request is received by volume action system 571 for virtual machine 524. Once the action is received, volume action system 571 attempts to transfer the request to hypervisor management service 561 to allow management service 561 to process the request for the corresponding virtual machine. Once it is determined that hypervisor management system 561 is overloaded or unavailable, volume actions service 571 then identifies the last known location of virtual machine 524 using database 575 and transfers the action to the corresponding host and hypervisor. Accordingly, unlike the operation described in overview 400, the volume action service may inquire the hypervisor management service to handle the attach request before resorting, as fallback, to the location database stored with the action service.

Figure 6:
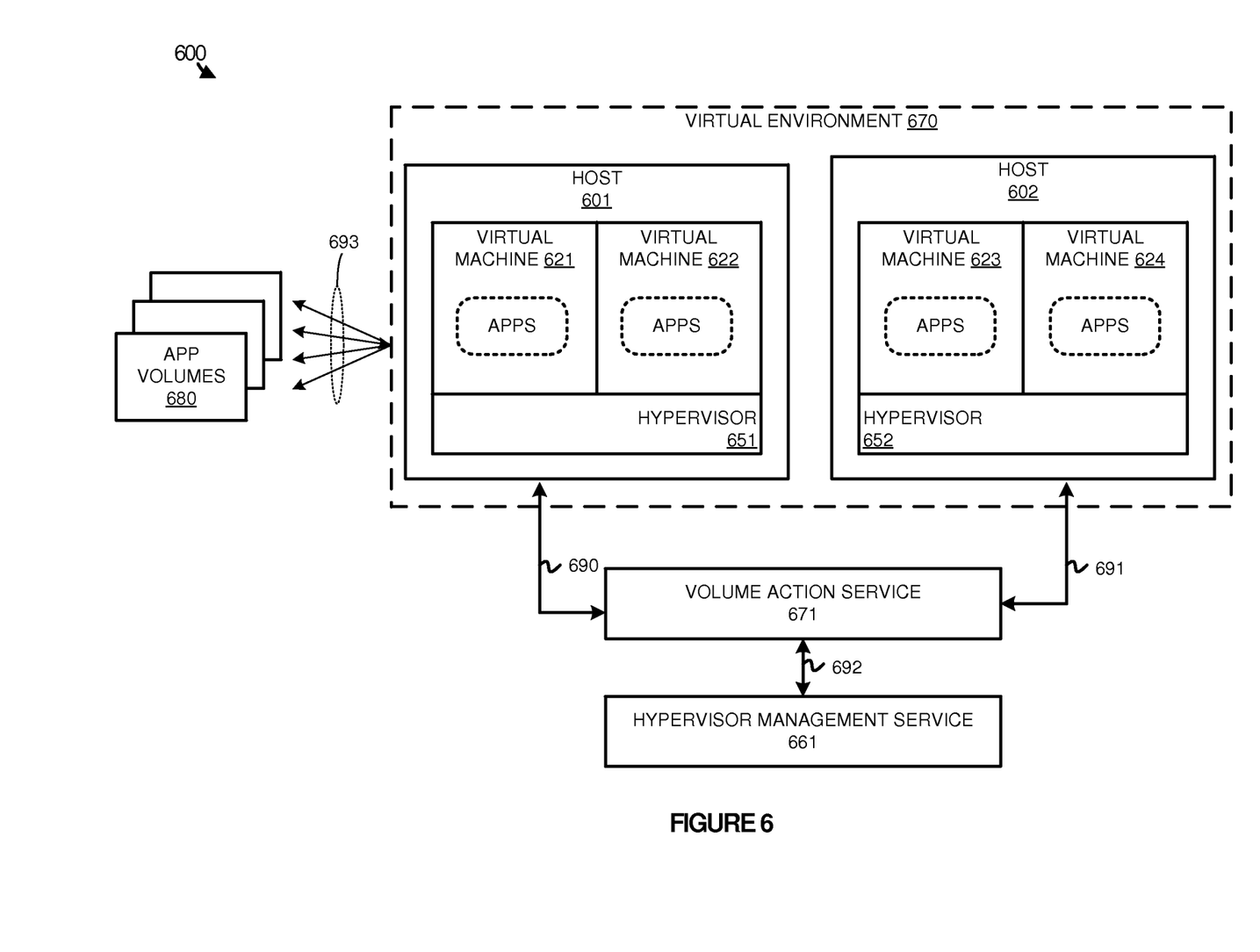
FIG. 6 illustrates a system for attaching and detaching application volumes.

FIG. 6 illustrates a system 600 for attaching and detaching applications based on volume action requests. System 600 includes virtual environment 670, hypervisor management service 661, volume action service 671, and application volumes 680. Virtual environment 670 further includes hosts 601-602, which use hypervisors 651-652 to execute virtual machines 621-624. Volume action service 671 communicates with hosts 601-602 over communication links 690-691 and further communicates with hypervisor management service 661 over communication link 692. Application volumes are communicatively coupled to hosts 601-602 in virtual environment 670 over communication links 693.

In operation, virtual machines 621-624 may attach or detach applications stored in application volumes 680. This attaching and detaching process allows the applications within the volumes to become available without installation within the virtual machine itself. Thus, the applications may be mounted, and through registry keys and other registry modifications, the application may be overlaid into the virtual system as if a user had installed the application locally. As illustrated in the present example, a volume action service is included that manages the attaching and detaching of volumes with the individual virtual machines within the system. To handle volume attach and detach action requests, volume action service 671 gathers virtual machine locations from a hypervisor management service 661. Hypervisor management service 661 allows for a centralized manager of a plurality of hypervisors and virtual machines. Accordingly, rather than requiring individual configuration of each of the virtual machines and hypervisors, an administrator may use hypervisor management service 661 to configure the plurality of hypervisors and virtual machines.

Once the locations are gathered, volume action requests may be processed by volume action service 671 without inquiring hypervisor management service 661 for locations on each request. For example, if a detach action request were received for virtual machine 624, volume action service 671 may transfer the request to hypervisor 652 to detach the appropriate volumes and applications from virtual machine 624.

In some instances, volume action service 671 may inquire hypervisor management service 661 at periodic increments. Accordingly, at each increment of the time period, volume action service 671 may gather updated locations of the various virtual machines, which may include host identifiers and hypervisor identifiers. By periodically maintaining the location database, volume action service may be able to keep track of recently initiated virtual machines, as well as virtual machines that may have migrated across hosts and hypervisors.

Referring to the elements of system 600, 601-602 may each comprise a real or virtual computing device. Hosts 601-602 may include processing systems, storage systems, user interfaces, communication interfaces, or any other similar computing elements. In particular, hosts 601-602 include hypervisors 651-652 to abstract component necessary to execute virtual machines 621-624.

Volume action service 671 and hypervisor management service 661 may each include communication interfaces, network interfaces, processing systems, computer systems, microprocessors, storage systems, storage media, or some other processing devices or software systems, and can be distributed among multiple devices. In some examples, volume action service 671 and hypervisor management service 661 comprise computer systems, such as server or desktop systems, configured to manage the operations of virtual machines within virtual environment 670.

Application volumes 680 may include storage systems and storage media capable of storing applications to be attached virtual machines 621-624. Although illustrated separate in the present example, it should be understood that application volumes 680 may be stored wholly or partially with hosts 601-602. In some examples, applications volumes 680 may comprise virtual hard disks, virtual machine disks, or any other volume that can be used to store applications for attachment to the virtual machines.

Communication links 690-693 use metal, glass, air, space, or some other material as the transport media. Communication links 690-693 could use various communication protocols, such as Time Division Multiplex (TDM), Internet Protocol (IP), Ethernet, communication signaling, a wireless communication format, such as Wireless Fidelity (WIFI), or some other communication format—including combinations thereof. Communication links 690-693 could be direct links or may include intermediate networks, systems, or devices.

Figure 7:
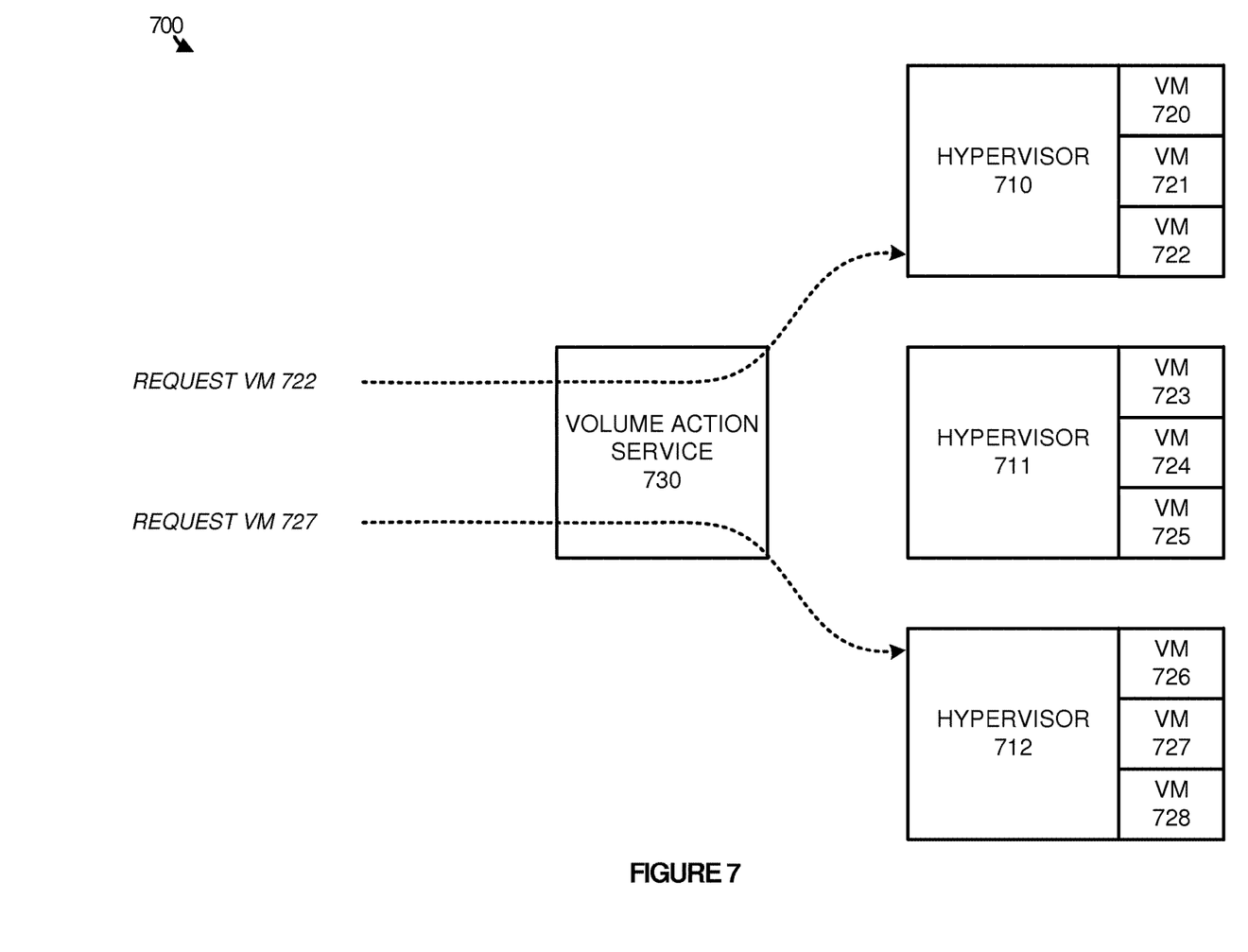
FIG. 7 illustrates an overview of directing a plurality of volume action requests using a volumes action service.

Referring to FIG. 7, FIG. 7 illustrates an overview 700 of directing a plurality of volume action requests using a volumes action service. Overview 700 includes hypervisors 710-712, which may execute via one or more host computing systems, virtual machines (VMs) 720-728, which execute via hypervisors 710-712, and volume action service 730. Similar to the operations described above, volume action service 730 retrieves location information for virtual machines 721-728 via a hypervisor management service. This location information for each virtual machine may include an identifier or address of the host computing system, an identifier for the hypervisor, and an identifier for the virtual machine.

Once the location information is retrieved, virtual machine users or administrators may initiate a volume action event for virtual machines with the computing environment. As depicted in the present example, two volume action requests are initiated to provide one or more volumes to two separate virtual machines. First, a volume action request is initiated for virtual machine 722 and is identified by volume action service 730. In response to identifying the request, volume action service 730 identifies the appropriate hypervisor 710 and host for the request, and forwards the request to hypervisor 710. Once identified by hypervisor 710, hypervisor 710 may initiate the process of attaching the appropriate volumes to the virtual machine.

Similarly, a second volume request may be initiated for virtual machine 727 that is identified by volume action service 730. In response to the request, volume action service 730 determines the location of virtual machine 727 and forwards the request to hypervisor 712. Once identified by hypervisor 712, hypervisor 712 may initiate the process of attaching the appropriate volumes to the virtual machine.

Figure 8:
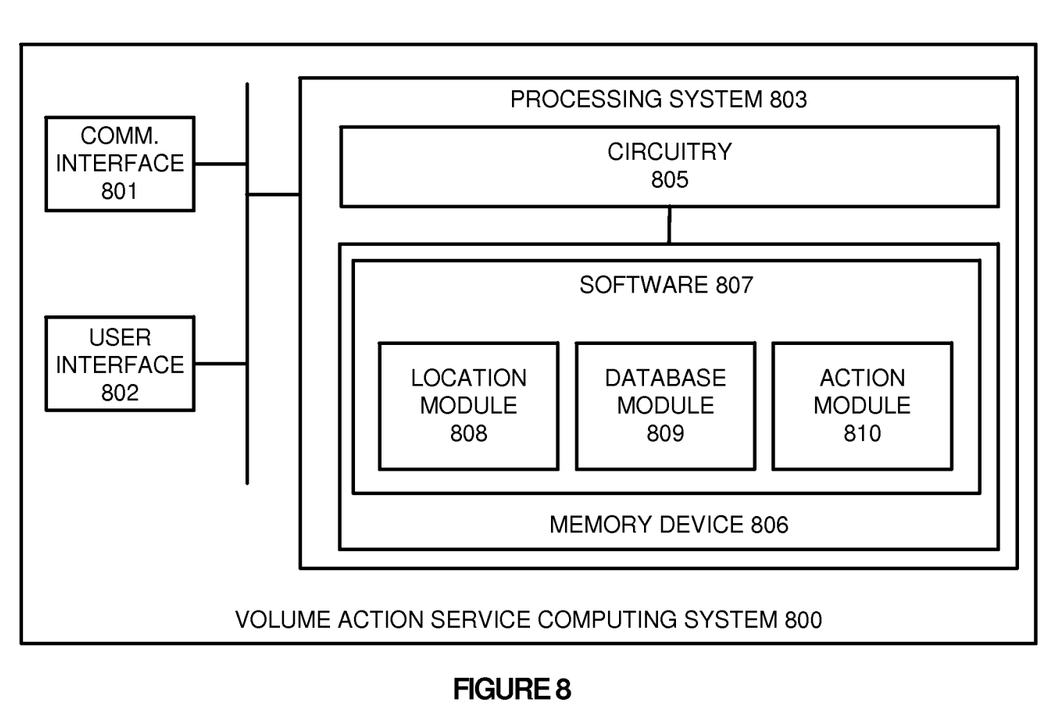
FIG. 8 illustrates a volume action service computing system to manage locations of virtual machines.

Here, by using the volume action service in place of the hypervisor management service, each of the volume action requests may be distributed to each of the hypervisors. Thus, instead of having a single service or system handle the attaching and detaching of volumes from the virtual machines, the hypervisors may individually handle the processes of attaching and detaching the volumes for their corresponding virtual machines FIG. 8 illustrates a volume action service computing system 800 to manage locations of virtual machines. Volume action service computing system 800 is representative of a computing system that may be employed in any computing apparatus, system, or device, or collections thereof, to suitably implement the volume action service elements described in FIGS. 1-6. Computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be configured to communicate with a hypervisor management service or server, and may further be configured to communicate with hosts and corresponding hypervisors.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes location module 808, database module 809, and action module 810. Although illustrated with three software modules in the present example, it should be understood that computing system 800 might include any number of software modules to carry out the operations described herein. Operating software 807 may further include an operating system, utilities, drivers, network interfaces, applications, or some other type of software. When executed by circuitry 805, operating software 807 directs processing system 803 to operate computing system 800 as described herein.

In particular, location module 808 may initiate requests for virtual machine locations from a hypervisor management service. In some examples, the location requests may be periodic, such as every ten minutes, every hour, or any other periodic time for location requests. Once the locations are received, database module 809 stores the locations to allow computing system 800 access to the locations for future volume action requests.

Accordingly, when an action request is received, such as a volume detach request, action module 810 identifies the request and forwards the request to the appropriate hypervisor and host based on the locations stored by database module 809. In some examples, action module 810 may rely only on the locations that are stored locally using database module 809. Thus, when an action is received, the action is forwarded to the appropriate location based only on the location information stored by computing system 800. In other examples, the location database may be used as a failsafe for an interruption with the hypervisor management service. As a result, when a volume action is identified, computing system 800 may first attempt to use the hypervisor management service for the location of the virtual machine, before resorting to the locally stored location information.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a volume action service to manage volumes and virtual machines, the method comprising:
   at periodic intervals, transferring location requests to a hypervisor management service to identify locations of one or more virtual machines, wherein the one or more virtual machines execute across a plurality of hypervisors, and wherein the hypervisor management service obtains the locations of the one or more virtual machines in relation to the plurality of hypervisors managed by the hypervisor management service;
   receiving, in response to the location requests, the locations of the one or more virtual machines and storing the locations in a location database of the volume action service, wherein the locations comprise one or more virtual machine identifiers associated with respective host and hypervisor identifiers for the one or more virtual machines;
   receiving a volume action request to attach one or more volumes to a first virtual machine of the one or more virtual machines; and
   in response to the volume action request for the first virtual machine, directing the volume action request from the volume action service to a hypervisor for the first virtual machine based on a virtual machine identifier associated with the first virtual machine and the location database without passing the volume action request to the hypervisor management service, wherein the request directs the hypervisor to attach the one or more volumes to the first virtual machine.

2. The method of claim 1 wherein the volume action request comprises a volume attach request to attach one or more volumes to the first virtual machine.

3. The method of claim 2 wherein the one or more volumes comprise one or more application volumes containing at least one application.

4. The method of claim 1 wherein the volume action request comprises a volume detach request to detach one or more volumes from the first virtual machine.

5. The method of claim 4 wherein the one or more volumes comprise one or more application volumes containing at least one application.

6. The method of claim 1 further comprising:
identifying a second volume action request for a second virtual machine; and
directing the second volume action request to a hypervisor for the second virtual machine based on a virtual machine identifier associated with the second virtual machine and the location database.

7. The method of claim 6 wherein the hypervisor of the first virtual machine comprises a different hypervisor than the hypervisor of the second virtual machine.

8. An apparatus to manage volumes and virtual machines, the apparatus comprising:
one or more non-transitory computer readable media; and
processing instructions stored on the one or more non-transitory computer readable media that, when executed by processing circuitry, direct the processing circuitry to:
at periodic intervals, transfer location requests to a hypervisor management service to identify locations of one or more virtual machines, wherein the one or more virtual machines execute across a plurality of hypervisors, and wherein the hypervisor management service obtains the locations of the one or more virtual machines in relation to the plurality of hypervisors managed by the hypervisor management service;
receive, in response to the location requests, the locations of the one or more virtual machines and storing the locations in a location database of the volume action service, wherein the locations comprise one or more virtual machine identifiers associated with respective host and hypervisor identifiers for the one or more virtual machines;
receive a volume action request to attach one or more volumes to a first virtual machine of the one or more virtual machines; and
in response to the volume action request for the first virtual machine, direct the volume action request from the volume action service to a hypervisor for the first virtual machine based on a virtual machine identifier associated with the first virtual machine and the location database without passing the volume action request to the hypervisor management service, wherein the request directs the hypervisor to attach the one or more volumes to the first virtual machine.

9. The apparatus of claim 8 further comprising the processing circuitry.

10. The apparatus of claim 8 wherein the volume action request comprises a volume attach request to attach one or more volumes to the first virtual machine.

11. The apparatus of claim 10 wherein the one or more volumes comprise one or more application volumes containing at least one application.

12. The apparatus of claim 8 wherein the volume action request comprises a volume detach request to detach one or more volumes from the first virtual machine.

13. The apparatus of claim 12 wherein the one or more volumes comprise one or more application volumes containing at least one application.

14. The apparatus of claim 8 wherein the processing instructions further direct the processing circuitry to:
identify a second volume action request for a second virtual machine; and
direct the second volume action request to a hypervisor for the second virtual machine based on a virtual machine identifier associated with the second virtual machine and the location database.

15. The apparatus of claim 14 wherein the hypervisor of the first virtual machine comprises a different hypervisor than the hypervisor of the second virtual machine.

16. A system to manage a plurality of storage volumes and a plurality of virtual machines, the system comprising:
one or more host computing systems executing a plurality of hypervisors;
the plurality of virtual machines executing via the plurality of hypervisors; and
a volume action service with a processing system configured to:
at periodic intervals, transfer location requests to a hypervisor management service to identify locations of the plurality of virtual machines, and wherein the hypervisor management service obtains the locations of the plurality of virtual machines in relation to the plurality of hypervisors managed by the hypervisor management service;
receive, in response to the location requests, the locations of the plurality of virtual machines and store the locations in a location database of the volume action service, wherein the locations comprise a plurality of virtual machine identifiers associated with respective host and hypervisor identifier for the plurality of virtual machines;
receive a volume action request to attach one or more volumes to a first virtual machine of the plurality of virtual machines; and
in response to the volume action request for the first virtual machine, direct the volume action request from the volume action service to a hypervisor of the plurality of hypervisors for the first virtual machine based on a virtual machine identifier associated with the first virtual machine and the location database without passing the volume action request to the hypervisor management service, wherein the request directs the hypervisor to attach the one or more volumes to the first virtual machine.

17. The system of claim 16 wherein the volume action request for the first virtual machine comprises one of:
a volume attach request to attach one or more volumes to the first virtual machine; or
a volume detach request to detach one or more volumes from the first virtual machine.

* * * * *